June 26, 1956 W. BAUERSFELD ET AL 2,751,813
OPTICAL SYSTEM FOR PHOTOGRAMMETRIC PLOTTING INSTRUMENTS
Filed Feb. 24, 1954

United States Patent Office 2,751,813
Patented June 26, 1956

2,751,813

OPTICAL SYSTEM FOR PHOTOGRAMMETRIC PLOTTING INSTRUMENTS

Walther Bauersfeld, Heidenheim (Brenz), and Heinrich Sonnberger, Oberkochen, Germany, assignors to Carl Zeiss, Heidenheim (Brenz), Wurttemberg, Germany Application February 24, 1954, Serial No. 412,166

Claims priority, application Germany March 4, 1953

6 Claims. (Cl. 88—24)

This invention concerns an optical system for photogrammetric plotting instruments which serves to project a portion of a photograph upon a plate bearing a measuring mark. Known instruments of this kind have a fixed objective, and in order to permit sharp definition of the image in different projection planes, an auxiliary optical system of variable focal length. Because of its limited image angle, this auxiliary system is carried in a gimbal suspension, with the projection center coinciding with the gimbals center.

Instruments of this kind suffer from the disadvantage that they only are usable with a given objective for plotting of photo views which are photographed with an objective with a corresponding focal length, and therefore a change of the focal length of the photographing objective must follow a corresponding change of the plotting objective. This measure means an inconvenience.

According to the invention, this drawback may be eliminated by having all lenses of the optical system with a common optical axis, while the entire system swivels gimbal-fashion about the projection center of the photographic view. By this measure it becomes possible to go over the photo point by point with the objective, so that the image points lying at any moment on the optical axis and their surroundings are focused with sufficient sharpness. Using this system it is not necessary that the objective has a large image angle because the objective turns too.

For setting the definition, the optical system may have at least one focusing element, such as a lens or group of lenses, which is slidable lengthwise of the optical axis so that the image on the projection plate can be sharply focused in all positions of rotation of the system.

A measure which has proved particularly advantageous is to fit the optical system at the locus of the projection center with a diaphragm and to place ahead of and behind this diagram one end fixed and slidable lens or lens group capable of being set so that the light rays issuing from the image point where the optical axis of the system penetrates the photo view, pass in parallel through the diaphragm and then reconverge in a single point on the projection plate. In this manner, the slidable lens at the projection plate end permits projection in different positions of the projection plane, while the focusing element at the photo end allows the image point to be projected in its focus in any position of the system.

In addition, by shifting the focusing element, the focal length at which different photographs have been taken can be considered. In particular, it is of advantage to have the focusing elements set by automatic action, with that lens or lens group at the photo end in dependence upon the angle between the optical axis and the photo view perpendicular, while the focusing element at the projection plate end is dependent upon the distance between the projection plate and the projection center.

An especially advantageous possibility of automatic setting for the photo end focusing element is obtained when the lens group facing the photograph consists of two either one-piece or composite lenses, the fixed-lens group having a negative focal length f, and the axially slidable group an identical but positive focal length f.

Assuming that the focal length to the photograph is F, while $u$ is the angle which the optical axis of the system includes with the photo view perpendicular, then the measure $d$ of the lens shift required for causing the rays to pass in parallel through the diaphragm in the projection center is $$d = (f^2/F) \cdot \cos u$$

i. e. proportional to cos $u$. It is therefore only necessary so to govern the turning movement as to cause it to be proportional to the cosine of the angle of swing. How this is accocmplished may be seen from the following description of the drawing, and in which additional details of the invention will be pointed out.

The drawing represents a specimen design of the invention in which.

Figures 1, 3:
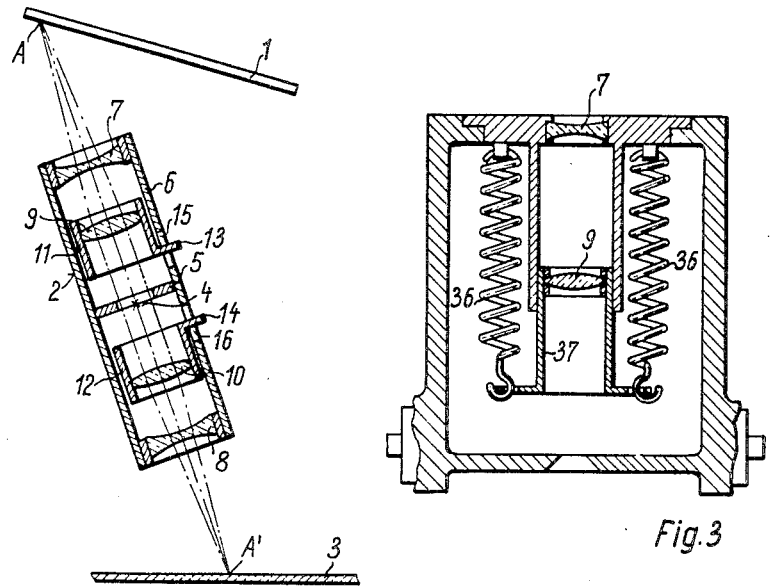
Fig. 1 is an optical system with two focusing elements.
Fig. 3 is a section through another design of the governing device of Fig. 2.

Fig. 1 shows an image point A on a photo plate 1 projected by an optical system 2 at a point A' of a plate 3. At the locus of projection center 4, a diaphragm 5 is arranged, through which the light rays of image point A pass in parallel. In a housing 6, two dispersion lenses 7 and 8 are provided at either end of diaphragm 5. Provided in addition at either end of diaphragm 5 are two collective lenses 9 and 10, which can be displaced axially in housing 6 by means of sleeves 11 and 12. The shift of these lenses is effected from the outside by means of pins 13 and 14 attached to the sleeves 11 and 12 and reaching through recesses 15 and 16 in the housing.

By shifting lens 9, the light rays of each image point A can be caused to pass in parallel through diaphragm 5 when system 2 is turned about projection center 4, and at any distance between photo 1 and projection center 4. The same effect is attained for point A' on plate 3 by shifting lens 10.

Figure 2:
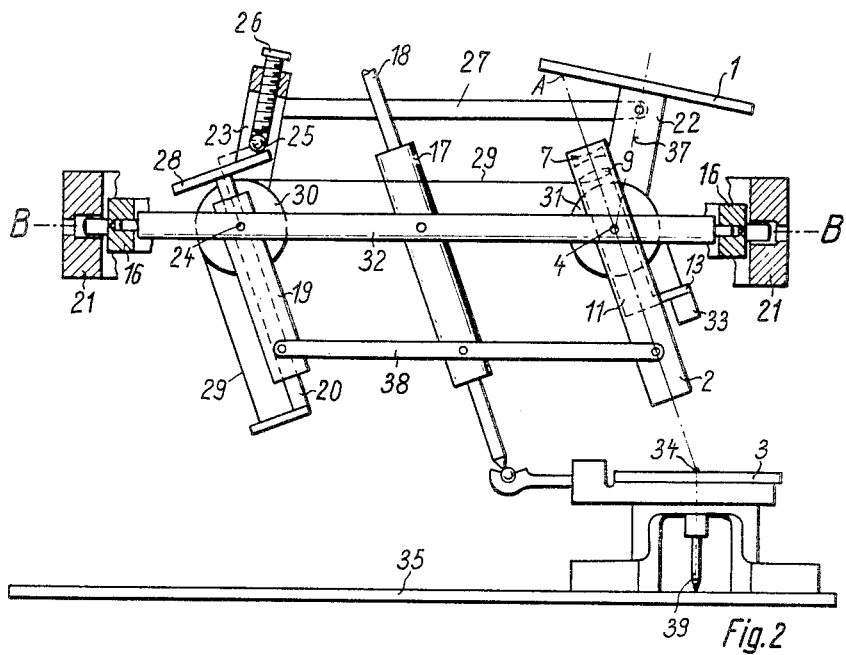
Fig. 2 is a side view of a mechanical governing device for the photo end focusing element, shown in part in section.

Fig. 2 shows a mechanical contrivance for shifting lens 9 proportionally to the cosine of the angle of swing of the optical system. This system 2 shows at the end of photo plate 1 two lenses 7 and 9, 7 being fixed and having a negative focal length f, while 9 is axially slidable and has an identical but positive focal length f. The lenses 8 and 10 at the projection plane end are not shown for reasons of better clearness. System 2 is carried in gimbals in a frame 16. Arranged parallel to system 2 are a sleeve 17 of principal directant 18, and a sleeve 19 of an auxiliary directant 20, these parts being linked together by a rod 38.

Gimbals shaft B—B forms the tilting axis for the bearing of frame 16 in a fixed or vertically movable frame 21. Attached to frame 16 and linked thereto is a plate holder 22 in such manner that when the photograph is in position perpendicular 37 always passes through projection center 4. In the same way, an auxiliary carrier 23 is so disposed in frame 16 as to cause its longitudinal axis to pass at all times through gimbals point 24. Carrier 23 has a revolvable ball 25 at the end of a movable stud 26.

With the aid of a link 27, the axis of auxiliary carrier 23 is kept at all times parallel to the perpendicular of plate holder 22. Slidable in sleeve 19 is auxiliary directant 20, which carries a disk 28 at its upper end, while at its lower end is attached a cord 29 connected by way of pulleys 30 and 31 with the pins 13 of the sleeve 11 of lens 9. The axes of rotation of pulleys 30 and 31 are so carried in gimbals part 32 as to cause them to be perpendicular to axis B—B and to pass through gimbal points 24 and 4. Sliding sleeve 11 is to advantage equipped with an auxiliary weight 33 for continually keeping disk 28 drawn up against ball 25.

The mechanism works as follows:

When optical system 2 is swung by a small angle, for example in the direction of arrow C with the aid of main directant 18, auxiliary directant 20 makes an equal movement. Since the distance between the center of ball 25 and gimbals point 24 is constant, ball 25 now no longer presses against disk 28. The disk can now, under the pull of weight 33, execute a movement parallel to the optical axis until the disk is again in contact with ball 25. The magnitude of this parallel shift is proportional to the cosine of the angle of swing of the optical axis of the system relative to the plate perpendicular.

Larger movements are composed of the infinitesimal movements just described and in which ball 25 rolls along on disk 28. By using a distance between the center of ball 25 and gimbals center 24 corresponding to $f^2/F$, the relation previously stated is fulfilled, i. e. each point A of the photo 1 on plate holder 22 is sharply focused at measuring mark point 34. Main directant 18, which is slidable in sleeve 17, upon the optical system being swung causes plate 3 to shift correspondingly on table 35, so that once made, the setting on the measuring mark point is subsequently retained. During this process, a stylus 39 spots the measuring mark point corresponding to image point A on table 35.

Fig. 3 shows a different design, whereby lens 9 is shifted with the aid of gravity. As in the example of Fig. 2, the lenses 7 and 9 of the system have equal but opposite focal lengths. Lens 9 is suspended axially slidable by two springs 36 so tensioned as to cause the lens with its mounting 37 to drop by the amount $f^2/F$ when the system is in the vertical position. On inclining the system by angle $u$, an automatic sliding movement proportional to cos $u$ takes place. In this design, too, adaptation to the requisite focal length F can be easily effected by applying an additional weight to mounting 37. The design of Fig. 3, however, is usable only on condition that the photo plate is horizontal or is inclined to the horizontal only by small angular amounts.

We claim:

1. In a photogrammetric plotting instrument an optical system serving for projecting a portion of a photo view upon a plate provided with a measuring mark, all lenses of the system being arranged so as to have one optical axis in common, said system being gimbal suspended on the projection center of the photo view, said system having a diaphragm at the locus of the said projection center and having both ahead of and behind this diaphragm a fixed lens, and a focusing element slidable along said common optical axis; means to shift said focusing elements so as to image a point lying on said photo view and on said optical axis on to said plate, and to let pass the light rays coming from said point parallel through said diaphragm.

2. Photogrammetric plotting instrument as in claim 1, characterized in that said means for shifting said focusing elements move that focusing element at the photo view end in dependence upon the angle formed by the optical axis of the system and the perpendicular of said photo view, and the other focusing element at the plate end in dependence upon the distance between said plate and said projection center.

3. Optical system for photogrammetric plotting instruments comprising lenses which serve for projecting a portion of a photo view upon a plate, all lenses of the system being arranged so as to have one optical axis in common, and the said system being gimbal suspended on the projection center of the photo view, said system having a diaphragm at the locus of the said projection center and having both ahead of and behind this diaphragm a fixed lens of negative focal length f, as well as a focusing element slidable along said common optical axis of an equal but positive focal length f, means for shifting automatically at least one of said focusing elements, that focusing element at the photo view end being moved by said means in dependance upon the angle formed by the optical axis of the system and the perpendicular of said photo view, while the other focusing element at the plate end is moved by said means is dependent upon the distance between the said plate and the said projection center.

4. Optical system as in claim 3, characterized in that the means for shifting automatically that focusing element at the photo view end comprise an auxiliary directant linked together with said optical system so as turn in the same manner as the said system, a control disc movable in the direction of the optical axis of said system, a rotatable ball having a fixed center, said auxiliary directant being adapted to cause said control disc to remain in constant contact with the said rotatable ball, said fixed center being arranged in such wise that the distance between that fixed center and the point of rotation of the said auxiliary directant is proportional to the cosine of the angle of swing, and means for mechanical transmitting that distance to the sliding motion of the said focusing element.

5. Optical system as in claim 3, characterized in that the means for shifting automatically that focusing element at the photo view end comprises an auxiliary directant linked together with said optical system so as to turn in the same manner as the said system, a control disc movable in the direction of the optical axis of said system, a rotatable ball having a fixed center, said auxiliary directant being adapted to cause said control disc to remain in constant contact with the said rotatable ball, said fixed center being arranged in such wise that the distance between that fixed center and the point of rotation of the said auxiliary directant is proportional to the cosine of the angle of swing, and means for mechanical transmitting that distance to the sliding motion of the said focusing element, and means for variation of said distance between the ball center and the point of rotation of the said auxiliary directant.

6. Optical system as in claim 3, characterized in that the said focusing element at the photo view end is spring-suspended, so that its displacement is brought about by gravity.

References Cited in the file of this patent

UNITED STATES PATENTS

| 1,945,977 | Oswald | Feb. 6, 1934 |
| 1,980,147 | Wolfe | Nov. 6, 1934 |
| 2,464,795 | Cooke | Mar. 22, 1949 |
| 2,481,639 | Altman et al. | Sept. 13, 1949 |
| 2,492,870 | Kelsh | Dec. 27, 1949 |

FOREIGN PATENTS

| 21,211 | Great Britain | 1901 |
| 133,957 | Germany | Sept. 27, 1902 |
| 3,799 | Great Britain | 1912 |